(12) United States Patent
Hur et al.

(10) Patent No.: US 10,345,171 B2
(45) Date of Patent: Jul. 9, 2019

(54) TORQUE ANGLE SENSOR MODULE

(71) Applicant: SKF SEALING SOLUTIONS KOREA CO., LTD., Daegu (KR)

(72) Inventors: Yong Soo Hur, Daegu (KR); Chun Soo Han, Daegu (KR); Jung Sik Choi, Daegu (KR); Seong Jun Park, Daegu (KR); Shin Ho Kang, Daegu (KR)

(73) Assignee: SKF SEALING SOLUTIONS KOREA CO., LTD., Daegu (KR)

( * ) Notice: Subject to any disclaimer, the term of this patent is extended or adjusted under 35 U.S.C. 154(b) by 0 days.

(21) Appl. No.: 15/575,645

(22) PCT Filed: Oct. 28, 2016

(86) PCT No.: PCT/KR2016/012291
§ 371 (c)(1),
(2) Date: Nov. 20, 2017

(87) PCT Pub. No.: WO2017/078334
PCT Pub. Date: May 11, 2017

(65) Prior Publication Data
US 2018/0120182 A1 May 3, 2018

(30) Foreign Application Priority Data
Nov. 4, 2015 (KR) ........................ 10-2015-0154786

(51) Int. Cl.
| | | |
|---|---|---|
| *G01L 3/10* | (2006.01) |
| *G01L 5/22* | (2006.01) |
| *B62D 6/10* | (2006.01) |
| *G01D 5/14* | (2006.01) |
| *B62D 15/02* | (2006.01) |
| *B62D 5/04* | (2006.01) |

(52) U.S. Cl.
CPC ............... *G01L 5/221* (2013.01); *B62D 6/10* (2013.01); *B62D 15/0215* (2013.01); *G01D 5/145* (2013.01); *G01L 3/10* (2013.01); *G01L 3/104* (2013.01); *G01L 5/22* (2013.01); *B62D 5/0457* (2013.01)

(58) Field of Classification Search
CPC .................................... G01L 3/10; G01L 5/22
See application file for complete search history.

(56) References Cited

U.S. PATENT DOCUMENTS

2013/0305843 A1* 11/2013 Lee .......................... G01L 3/104
73/862.325

FOREIGN PATENT DOCUMENTS

| KR | 20100105990 A | 10/2010 |
| KR | 20110055851 A | 5/2011 |

(Continued)

OTHER PUBLICATIONS

International Search Report for International Application No. PCT/KR2016/012291 (2 Pages) (dated Feb. 27, 2017).

*Primary Examiner* — Jamel E Williams
(74) *Attorney, Agent, or Firm* — Lucas & Mercanti, LLP

(57) ABSTRACT

The present invention relates to a magnet-integrated-type torque angle sensor module and, more particularly, to a torque angle sensor module that integrates magnets used for detecting steering direction, steering angle, torque, and steering speed and simplifies component configuration, capable of minimizing the rate of defects during assembly, improving disassembling ability, and inducing performance stabilization.

4 Claims, 4 Drawing Sheets

(56) References Cited

FOREIGN PATENT DOCUMENTS

| KR | 20120069869 A | | 6/2012 | |
|----|---------------|---|--------|---|
| KR | 20130044417 A | * | 5/2013 | |
| KR | 20150075878 A | | 7/2015 | |
| WO | WO 2011062399 A2 | * | 5/2011 | ............... B62D 6/10 |

* cited by examiner

TORQUE ANGLE SENSOR MODULE

CROSS-REFERENCE TO RELATED APPLICATIONS

This application is a 371 of PCT/KR2016/012291, filed Oct. 28, 2016, which claims the benefit of Korean Patent Application No. 10-2015-0154786, filed Nov. 4, 2015.

TECHNICAL FIELD

The present invention relates to a magnet integrated torque angle sensor module, and more particularly, to a torque angle sensor module capable of minimizing a defect rate during assembly, improving disassembling ability, and inducing performance stabilization by integrating magnets used for detecting a steering direction, a steering angle, a torque, and a steering speed to simplify a component configuration.

BACKGROUND ART

Generally, an auxiliary steering device is used as a device configured to ensure steering stability of a vehicle and assist with separate power. In such an auxiliary steering device, a device using a hydraulic pressure has been typically used, but recently, an electric steering device having a low power loss and superior accuracy is used.

The electric steering device drives a motor by an electronic control device according to a driving condition and manipulation information of a driver, which are detected by a vehicle speed sensor, a torque sensor, an angle sensor, and the like, to ensure turning stability and promptly provide a restoring force, thereby allowing the driver to safely drive.

The vehicle speed sensor is a device configured to sense a running speed of a vehicle that is driving, the torque sensor is a device configured to sense a torque applied to a steering shaft and output an electric signal proportional to the sensed torque, and the angle sensor is a device configured to output an electric signal proportional to a rotational angle of the steering shaft.

Recently, a torque angle sensor is proposed as a device configured with a single sensor in which the torque sensor and the angle sensor among these sensors are integrated to sense steering handle manipulation information of a user, and the use thereof is increasing.

FIG. 1 is an exploded perspective view illustrating such a conventional torque angle sensor.

The torque angle sensor is configured with an upper case 100, a rotor 500, a stator 600, a printed circuit board (PCB) 400, a main gear 410, a sub-gear 420, and a lower case from a top to a bottom of the torque angle sensor module.

The rotor 500 and the stator 600, which serve a sensing function of the torque sensor, are disposed at an upper side based on the PCB 400, and the gears 410 and 420 serving as the angle sensor are disposed at a lower side based on the PCB 400.

In the case of the torque sensor, magnets are disposed along an outer circumferential surface of the rotor 500, and the stator 600 having protruding pieces corresponding to polarities of the magnets is disposed at an outer circumferential surface of the magnets such that the torque sensor detects a torque of each of a input shaft and an output shaft by detecting a magnetic amount according to a difference in rotation amount between the rotor 500 and the stator 600 and transmits the detected torque to an electronic control device.

In the case of the angle sensor, as a driver rotates a steering handle, the main gear 410 attached to a steering shaft rotates in synchronization with the rotation of the steering handle and thus a difference in rotational angle is generated, and, at this point, Hall integrated circuits (ICs) 401 and 402 recognize magnetic field and rotational direction of the magnets attached to sub-gears 420 that are attached to the main gear 410 such that the angle sensor transmits a signal to the electronic control device.

However, since a backlash (a gap between a pair of gears) is generated due to an engagement structure between the main gear and the sub-gears, there is a problem for the angle sensor in that an accurate measurement of a steering angle is very difficult.

In addition, there causes a problem in that an assembling man-hour and a defect rate are increased during assembly due to a large number of components, and there is a problem of increasing cost due to the large number of components, and specifically, since two or more Hall ICs with relatively high prices should be configured, an increase of manufacturing costs is caused.

DISCLOSURE

Technical Problem

To resolve the above-described problems, it is an objective of the present invention to provide a torque angle sensor module capable of minimizing a defect rate during assembly, improving disassembling ability, and inducing performance stabilization by forming magnets with multipole, which are configured with tracks provided at three or more positions, at an outer circumferential surface of a rotor connected to an output shaft to simplify a component configuration of the torque angle sensor module.

Technical Solution

The present invention has the following features to attain the above-described objective.

According to the present invention, there is provided a torque angle sensor module disposed between a steering input shaft and an output shaft, which is configured to include a case housing in which an upper case and a lower case are vertically connected to form a predetermined accommodating space inside the case housing, and into which the input shaft is inserted through an upper portion side of the case housing and the output shaft is inserted through a lower portion side thereof; a stator disposed inside the case housing and connected to the input shaft to be rotated therewith; a rotor disposed to be spaced apart from an inner circumferential surface of the stator, connected to the output shaft to be rotated therewith, and having an outer circumferential surface at which first magnets with multipole and second magnets with multipole are formed; an angle sensor installed outside the first magnets of the rotor and configured to detect a magnetic flux change of the first magnets of the rotor to sense a rotation amount of the output shaft; a torque sensor installed outside the second magnets of the rotor and configured to detect a magnetic flux change of the second magnets of the rotor to sense a torque amount between the input shaft and the output shaft; and a printed circuit board (PCB) substrate on which the angle sensor and the torque sensor are electrically connected.

Here, the first magnets of the rotor may be configured with a first magnet strip with multipole and a second magnet strip with multipole, which are vertically disposed along a horizontal outer circumferential surface of the rotor, polarity distributions of the first magnet strip and the second magnet strip may be disposed to be vertically mismatched to each other, and a shielding block may be further provided between the first magnets and the second magnets and configured to shield magnetic fields of the first magnets and the second magnets.

Also, each of the angle sensor and the torque sensor may be preferably one of a magnetoresistive element (AMR IC) and a Hall integrated circuit (IC), the angle sensor may be installed outside the first magnets of the rotor at two positions spaced apart from each other by a predetermined distance, and while only one of the angle sensors installed at the two positions detects a magnetic flux change of the first magnets of the rotor, when the one angle sensor is determined not to operate, the other angle sensor may be configured to operate.

Advantageous Effects

In accordance with the present invention, the main gear and the sub-gear of the existing torque angle sensor module are removed according to a configuration modification of the rotor, which is configured with tracks with multipole, which are provided at three or more positions, and the stator disposed to be spaced apart from the outer circumferential surface of the rotor, so that there is an effect of preventing deterioration of accuracy due to a backlash and the like.

Further, according to simplification of the number of components, there is an effect in which an assembling man-hour and a defect rate, which occur during assembly, are reduced to improve productivity.

MODES OF THE INVENTION

Figure 1:
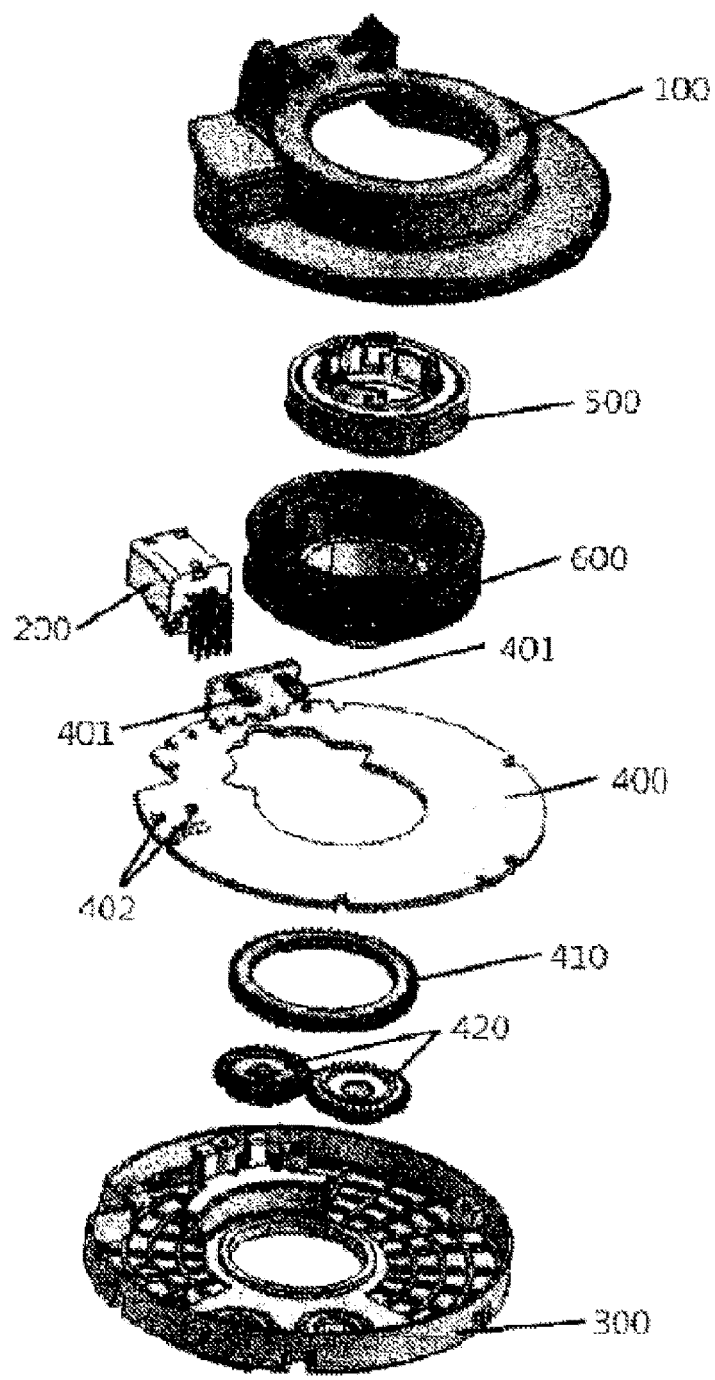
FIG. 1 is an exploded perspective view illustrating a conventional torque angle sensor module.

Hereinafter, a preferred embodiment of the present invention will be described in detail with reference to the accompanying drawings. For reference, sizes, thicknesses of lines, and the like of components illustrated in the drawings, which are referenced in the description of the present invention, may be somewhat exaggerated. Terms used in the description of the present invention are defined in consideration of functions in the present invention, and thus these terms may be changed according to a user, an intent of an operator, customs, and the like. Therefore, the definition of these terms should be made on the basis of the entire contents of this specification.

Figure 2:
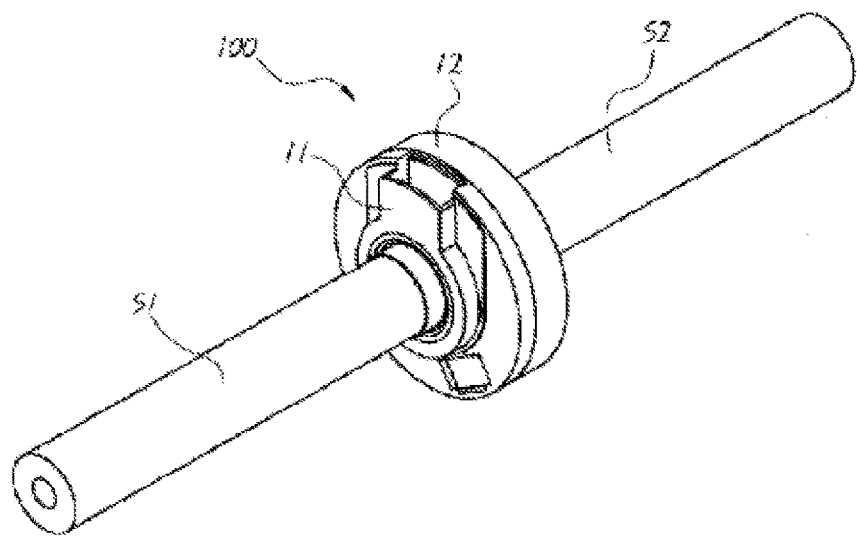
FIG. 2 is a perspective view illustrating a coupled state of a torque angle sensor module, an input shaft, and an output shaft according to one embodiment of the present invention.

FIG. 2 is a perspective view illustrating a coupled state of a torque angle sensor module, an input shaft, and an output shaft according to one embodiment of the present invention.

A torque angle sensor module 100 according to the present invention is disposed between an input shaft S1 and an output shaft S2.

The input shaft S1 is connected to a steering handle (not shown), which is installed at a driver seat of a vehicle and is rotated by an external force according to a manipulation force of a driver, and is rotated in synchronization with the steering handle.

The output shaft S2 is connected to front wheels of the vehicle, which is steering wheels, and receives power from the input shaft S1 to be rotated.

In addition, an exterior of the torque angle sensor module 100 is formed with a case housing 10 that is configured with an upper case 11 and a lower case 12, and a stator 20, a rotor 30, an angle sensor 40, a torque sensor 50, and the like are mounted inside the case housing 10.

Figure 3:
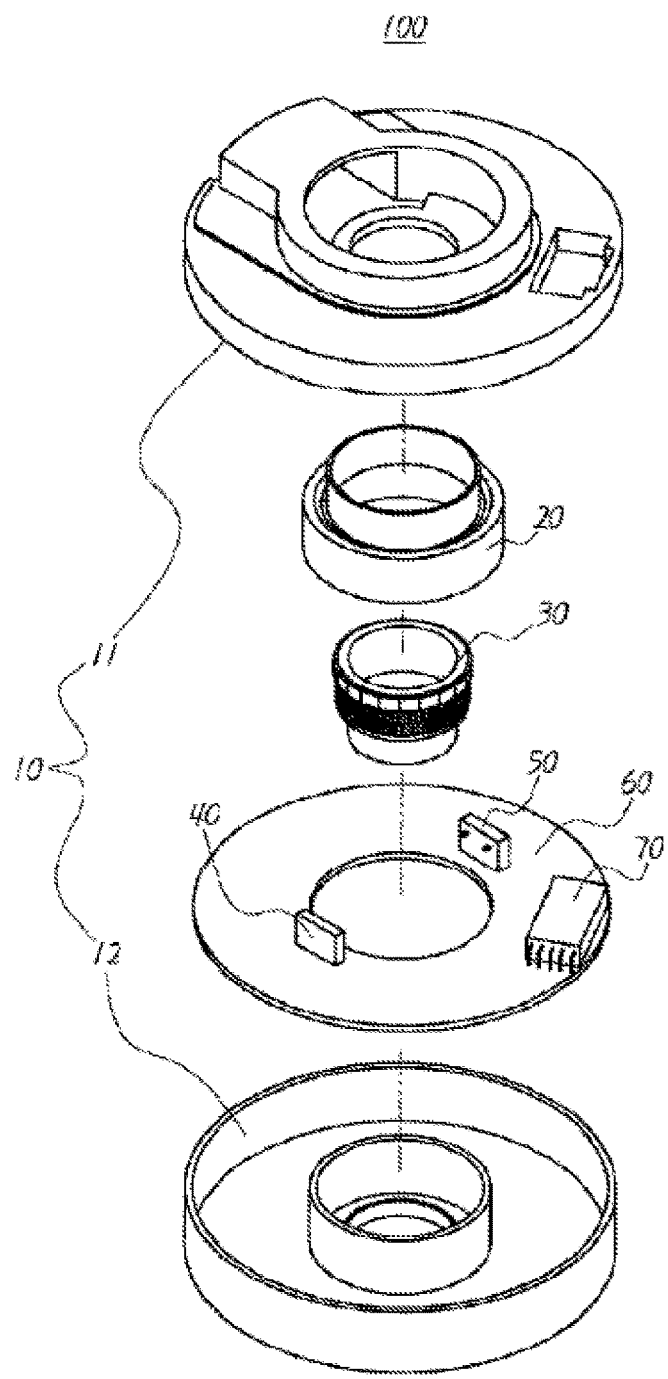
FIG. 3 is an exploded perspective view of the torque angle sensor module according to one embodiment of the present invention.
Figure 4:
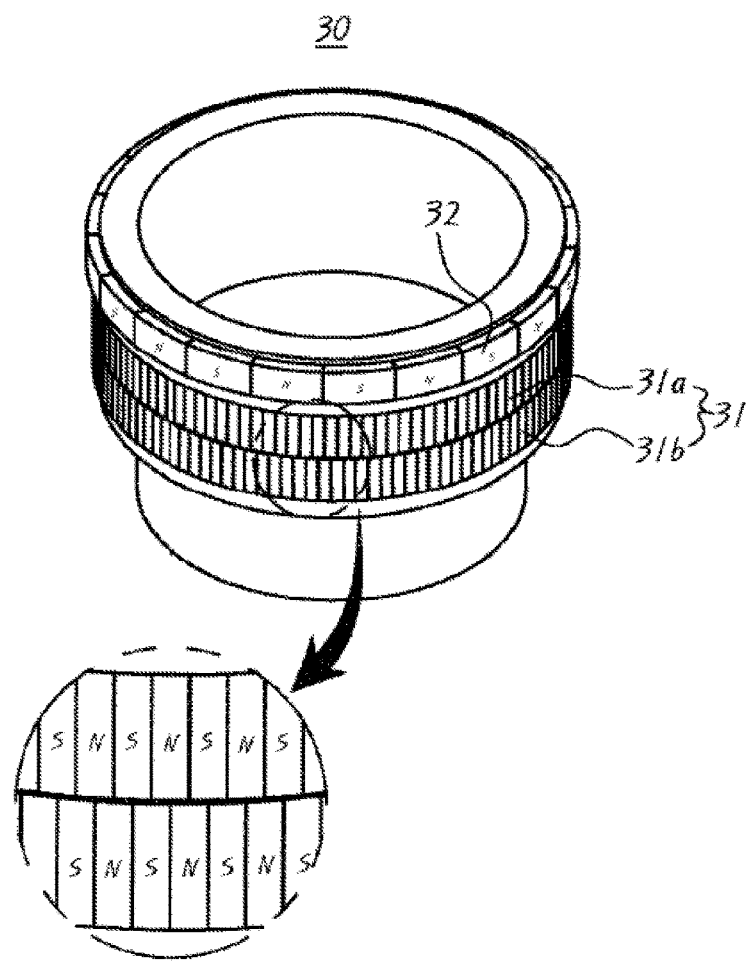
FIG. 4 is a diagram illustrating a rotor according to one embodiment of the present invention.

FIG. 3 is an exploded perspective view of the torque angle sensor module according to one embodiment of the present invention, and FIG. 4 is a diagram illustrating a rotor according to one embodiment of the present invention.

Referring to the drawings, the torque angle sensor module 100 according to one embodiment of the present invention is configured with the case housing 10 in which the upper case 11 and the lower case 12 are vertically coupled to roughly form a predetermined accommodating space and into which the input shaft is inserted at an upper portion of the case housing 10 and the output shaft S2 is inserted at a lower portion of case housing 10; the stator 20 disposed inside the case housing 10 and connected to the input shaft S1 to be rotated therewith; the rotor 30 disposed to be spaced apart from an inner circumferential surface of the stator 20, connected to the output shaft S2 to be rotated therewith, and having an outer circumferential surface at which first magnets 31 with multipole and second magnets 32 with multipole are formed; the angle sensor 40 installed outside the first magnets 31 of the rotor 30 and configured to detect a magnetic flux change of the first magnets 31 of the rotor 30 to sense a rotation amount of the output shaft S2; the torque sensor 50 installed outside the second magnets 32 of the rotor 30 and configured to detect a magnetic flux change of the second magnets 32 of the rotor 30 to sense a torque amount between the input shaft S1 and the output shaft S2; and a printed circuit board (PCB) substrate 60 on which the angle sensor 40 and the torque sensor 50 are electrically connected.

Here, the stator 20 is connected to the input shaft S1 to be rotated therewith, and a through-hole is formed at a central portion of the stator 20 and thus the input shaft S1 is inserted into the through-hole such that the input shaft S1 and the stator 20 are coupled.

Although not shown in the drawings, teeth are formed at the inner circumferential surface of the stator 20 to form a magnetic field in association with the first magnets 31 and the second magnets 32 of the rotor 30.

Meanwhile, the rotor 30 is disposed to be spaced away from the inner circumferential surface of the stator 20 and is connected to the output shaft S2. In addition, the rotor 30 is couplable to the output shaft S2 passing through the central portion of the rotor 30, and the first magnets 31 with multipole and the second magnets 32 with multipole, of which N and S poles are alternately disposed, are respectively formed at an outer circumferential surface of the rotor 30.

Here, the first magnets 31 of the rotor 30 are configured with a first magnet strip 31a with multipole and a second magnet strip 31b with multipole, which are vertically disposed along a horizontal outer circumferential surface of the rotor 30, and polarity distributions of the first magnet strip 31a and the second magnet strip 31b are disposed to be vertically mismatched to each other.

Also, a shielding block 33 configured to shield magnetic fields of the first magnets 31 and the second magnets 32 is preferably formed between the first magnets 31 and the second magnets 32.

The angle sensor 40, which is disposed to be spaced apart from the first magnets 31 by a predetermined distance, may detect a change amount of magnetic flux of the first magnets 31 of the rotor 30 to sense a rotation amount of the output shaft S2.

That is, the angle sensor 40 calculates a steering angle of each of the first magnet strip 31a and the second magnet strip 31b on the basis of magnetic signals with respect thereto, and compares the magnetic signals with each other to calculate a final steering angle with respect to an entire rotation section.

Further, since the change amount of the rotational angle may be measured through the first magnet strip 31a and the second magnet strip 31b even when only a single angle sensor 40, e.g., a single Hall IC, is provided, one Hall IC may be removed from two Hall ICs required for detecting a change amount of a rotational angle of an output shaft through a conventional gear configuration.

Also, the torque sensor 50 is disposed to be spaced apart from the second magnets 32 by a predetermined distance and detects a change amount of magnetic flux of the second magnets 32 to sense a torque (a distortion force) of each of the input shaft S1 and the output shaft S2.

That is, a magnetic field formed between the second magnets 32 of the rotor 30 and the stator 20 is changed according to a difference in rotational angle between the stator 20 coupled to the input shaft S1 and the rotor 30 coupled to the output shaft S2, and thus the torque sensor 50 senses a change in the magnetic field.

In addition, the angle sensor 40 and the torque sensor 50 are respectively preferably any one of a magnetoresistive element (e.g., an AMR IC) and a Hall IC, and are electrically connected on the PCB substrate 60 to perform an operative driving.

Here, the angle sensor 40 may be installed outside the first magnets 31 of the rotor 30 at two positions spaced apart from each other by a predetermined distance according to one embodiment of the present invention.

In this case, while only one of the angle sensors 40 installed at the two positions detects a magnetic flux change of the first magnets 31 of the rotor 30, when the one angle sensor 40 is determined not to operate, that is, an incorrect operation occurs, the other angle sensor 40 may be configured to operate.

Also, detection information, which is sensed from the angle sensor 40 and the torque sensor 50, is transmitted to an external microcontroller through a connector 70 installed at the PCB substrate 60, and the microcontroller compares a preset reference value with the detection information to determine the torque amount and the rotation amount.

The torque angle sensor module as described above may be provided with the angle sensor 40 and the torque sensor 50 to detect a steering intent of a driver and a rotational angle of the steering handle.

Therefore, an auxiliary steering force may be provided to the steering wheels according to the steering intent of the driver to enable the driver to manipulate the steering handle with a small force, and the rotational angle of the steering handle may be used as data for controlling a vehicle, or information regarding the steering handle that has been rotated may be provided to the user.

In addition, the first magnets 31 configured to detect a rotation amount and the second magnets 32 configured to detect a torque may be integrated into the rotor 30 according to the present invention to completely remove a gear portion of the existing torque angle sensor module, and, through such component simplification, an assembling man-hour may be reduced and a defect rate occurring during assembly may be decreased, and at the same time an error of the detection information due to a backlash and the like of the existing gear portion is fundamentally removed.

While the practical exemplary embodiment of the present invention has been described, it should be understood that the present invention is not limited to this embodiment disclosed herein and the accompanying drawings, and it can be variously modified by those skilled in the art without departing from the technical spirit of the present invention.

The invention claimed is:

1. A torque angle sensor module disposed between a steering input shaft and an output shaft, the torque angle sensor module comprising:
    a case housing in which an upper case and a lower case are vertically connected to form a predetermined accommodating space inside the case housing, and into which the input shaft is inserted through an upper portion side of the case housing and the output shaft is inserted through a lower portion side thereof;
    a stator disposed inside the case housing and connected to the input shaft to be rotated therewith;
    a rotor disposed to be spaced apart from an inner circumferential surface of the stator, connected to the output shaft to be rotated therewith, and having an outer circumferential surface at which first magnets with multipole and second magnets with multipole are formed;
    an angle sensor installed outside the first magnets of the rotor and configured to detect a magnetic flux change of the first magnets of the rotor to sense a rotation amount of the output shaft;
    a torque sensor installed outside the second magnets of the rotor and configured to detect a magnetic flux change of the second magnets of the rotor to sense a torque amount between the input shaft and the output shaft; and
    a printed circuit board (PCB) substrate on which the angle sensor and the torque sensor are electrically connected,
    wherein the first magnets of the rotor are configured with a first magnet strip with multipole and a second magnet strip with multipole, which are vertically disposed along a horizontal outer circumferential surface of the rotor, and polarity distributions of the first magnet strip and the second magnet strip are disposed to be vertically mismatched to each other.

2. The torque angle sensor module of claim 1, further comprising a shielding block provided between the first magnets and the second magnets and configured to shield magnetic fields of the first magnets and the second magnets.

3. The torque angle sensor module of claim 1, wherein each of the angle sensor and the torque sensor is one of a magnetoresistive element (AMR IC) and a Hall integrated circuit (IC).

4. The torque angle sensor module of claim 1, wherein the angle sensor is installed outside the first magnets of the rotor at two positions spaced apart from each other by a predetermined distance, and
    while only one of the angle sensors installed at the two positions detects a magnetic flux change of the first magnets of the rotor, when the one angle sensor is determined not to operate, the other angle sensor is configured to operate.

\* \* \* \* \*